F. STARIN.
DRILL CHUCK.
APPLICATION FILED MAY 6, 1914.

1,114,653.

Patented Oct. 20, 1914.

WITNESSES
Hugo Rowe.
S. Birnbaum

INVENTOR
Frank Starin
BY
Sigmund Herzog
his ATTORNEY

UNITED STATES PATENT OFFICE.

FRANK STARIN, OF SPRINGFIELD, MASSACHUSETTS.

DRILL-CHUCK.

1,114,653.

Specification of Letters Patent.

Patented Oct. 20, 1914.

Application filed May 6, 1914. Serial No. 836,701.

*To all whom it may concern:*

Be it known that I, FRANK STARIN, a subject of the Emperor of Austria-Hungary, and resident of the city of Springfield, in the county of Hampden and State of Massachusetts, have invented certain new and useful Improvements in Drill-Chucks, of which the following is a specification.

The present invention relates to improvements in chucks for holding drills or similar tools.

One of the objects of the invention is to provide a device of this type wherein the several gripping jaws are made of one integral piece.

Another object of the invention is to provide coöperating means upon the jaws of the chuck and upon the shank of the tool, whereby the tool is always positively driven, the jaws serving as alining means only, and to keep the tool from falling out.

With these and other objects in view, which will more fully appear as the nature of the invention is better understood, the same consists in the combination, arrangement and construction of parts hereinafter fully described, pointed out in the appended claims and illustrated in the accompanying drawings, it being understood that many changes may be made in the size and proportion of the several parts and details of construction within the scope of the appended claims without departing from the spirit or sacrificing any of the advantages of the invention.

One of the many possible embodiments of the invention is illustrated in the accompanying drawings, in which:—

Figure 1:
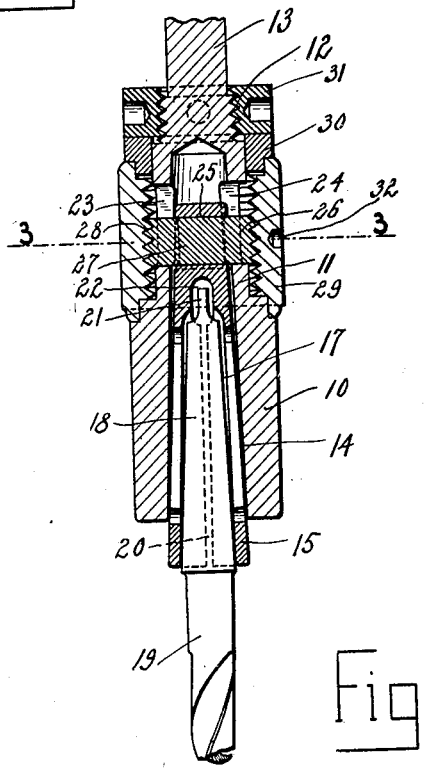
Figure 2:
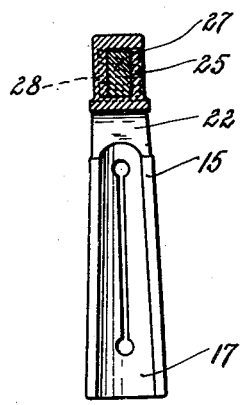
Figure 3:
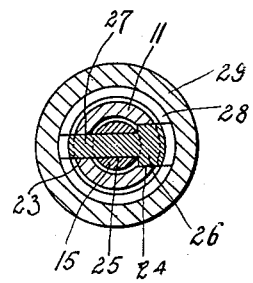

Figure 1 is a central vertical section taken through a drill chuck constructed in accordance with the present invention, its jaws being shown in their open positions; Fig. 2 is a section taken through the jaws of the chuck in a plane at right angles to that of the section shown in Fig. 1; and Fig. 3 is a section taken on line 3—3 of Fig. 1.

In the drawings, the numeral 10 indicates the chuck body, which is, preferably, formed of steel and cylindrical in shape. Its upper portion 11 is reduced in diameter, and provided with a screw threaded section 12, above which is disposed the arbor 13 of the chuck, said arbor being made integral with the body 10. A conical bore 14 extends centrally in an axial direction through the body 10 and through the reduced portion 11 of the chuck for the reception of a conical jaw-body 15. In this body is formed a conical bore 17, in which is adapted to be seated the conical head 18 of a drill 19, or other analogous tool. The body 15 is longitudinally slit, as shown at 20, whereby jaws are formed that are adapted to grip the head of the shank of the tool when the jaw-body 15 is moved longitudinally into the body 10 of the chuck. The head 18 of the tool is flattened at 21, said flattened part being adapted to be seated in a correspondingly shaped recess 22 in the body 15. In diametrically opposite parts of the reduced portion 11 of the chuck are formed longitudinal slots 23 and 24, the slot 24 being considerably wider than the slot 23. In alinement with the said slots is formed in the jaw-body 15 a transverse aperture 25, that is, preferably, oblong in cross section, as clearly shown in Fig. 2 of the drawings, its width corresponding to that of the slot 23. The height of the aperture 25 is considerably smaller than the height of either one of the slots 23 or 24. In the slot 24 is seated the head 26 of a flat member 27, that extends through the aperture 25 in the head 18 into the slot 23 in the chuck-body 10. The head 26, preferably, closely fits the slot 24, the member 27 fitting in a similar manner the aperture 25 and the slot 23, thereby preventing a relative rotary movement between the jaw-body and the chuck-body, but permitting a relative motion in axial direction, inasmuch as the height of the flat member 27 is substantially smaller than the height of either one of the slots 23 or 24. The end of the flat member 27 and also the head 26 project beyond the reduced portion 11 of the chuck-body and are provided with screw threads 28, in mesh with those of a nut 29, that is drawn over the reduced portion 11 of the chuck-body and held thereon against longitudinal motion by means of a collar 30 and a nut 31, the threads of the latter meshing with the threads 12 above described. The nut 29 is provided with wrench-holes 32 for the insertion of the end of a pin or a proper wrench, by which the said nut may be turned in either direction.

The operation of this device is as follows: In Fig. 1 of the drawings the jaws of the chuck are shown in their outermost and open positions. In inserting the tool into the chuck, its flattened head 21 is entered into the recess 22 in the jaw-body 15, and then the nut 29 turned in the proper direction to move the body 15 longitudinally inward, whereby the jaws thereof are, by reason of the conical configuration of the bore 14 and the similar configuration of the outer face of the body 15, caused to move toward the axis of the chuck and to grip the tool between them. Inasmuch as the flattened head 21 of the shank of the tool is seated within the recess 22 in the jaw-body 15, a positive drive of the tool is obtained, the jaws of the chuck serving only to hold the tool in its central position and preventing it from falling out from the chuck. By turning the nut 29 in a direction opposite to the one above described, obviously the jaw-body 15 is caused to move longitudinally outward, by which movement the jaws separate to permit the drill or analogous tool to be withdrawn and replaced.

What I claim is:—

1. In a chuck, the combination with a chuck-body having a central conical bore, the upper end of said body being reduced in diameter and provided in diametrically opposite portions thereof with longitudinal slots, of a conical longitudinally slit jaw-body slidably disposed in said bore, said jaw-body being provided with a bore for receiving the head of the shank of the tool, the upper end of said jaw-body having a transverse aperture in alinement with the longitudinal slots in said chuck-body, a connecting member seated in said aperture and extending into the slots in said chuck-body, the ends of said member having screw threads, a nut drawn over the reduced portion of said chuck-body in mesh with the threads of said member, and means for holding said nut against longitudinal movement upon said chuck-body.

2. In a chuck, the combination with a chuck-body having a central conical bore, of a jaw body slidably disposed in said bore, said jaw body comprising a conical longitudinally slit member provided with a bore for receiving the head of the shank of the tool, means carried by said jaw body in engagement with said chuck body for preventing a relative rotary motion of said two bodies, but permitting said jaw body to move longitudinally inward or outward upon said chuck body, and means in engagement with said first named means for effectuating the longitudinal movement of said jaw body.

Signed at Springfield, in the county of Hampden and State of Massachusetts, this 29th day of April, A. D. 1914.

FRANK STARIN.

Witnesses:
ROBERT J. CHISHOLM,
FRITZ KRÖKER.